Patented May 21, 1929.

1,713,670

UNITED STATES PATENT OFFICE.

FRITZ MAYER, OF FRANKFORT-ON-THE-MAIN, GERMANY, ASSIGNOR TO GRASSELLI DYESTUFF CORPORATION, OF NEW YORK, N. Y., A CORPORATION OF DELAWARE.

PROCESS OF PREPARING PHTHALOYL-2.3-THIONAPHTHENES.

No Drawing. Application filed January 25, 1927, Serial No. 163,568, and in Germany January 29, 1926.

I have found that phthaloyl-2.3-thionaphthene and its substitution products can be obtained by causing phthalic anhydride or a substitution product thereof to act upon thionaphthene or a derivative thereof, and condensing the thionaphthenoyl benzoic acids thus obtained. The reaction takes place according to the following formula:

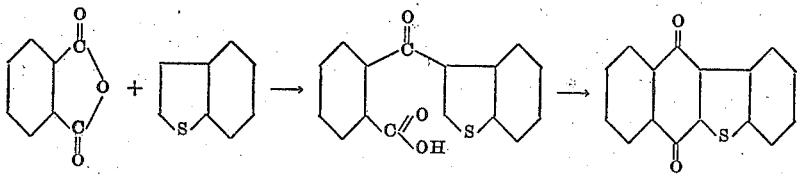

The compounds obtainable by the process of my present invention can be used as dyestuffs or as intermediate products for the preparation of the same.

The following example serves to illustrate my invention, but it is not intended to limit it thereto, all parts being by weight:

20 parts of thionaphthene are stirred in the cold for about 24 hours with 33 parts of phthalic anhydride and 25 parts of aluminium chloride in a carbon disulfide solution, and the mixture thus obtained is heated on the water-bath until the reaction is complete. The reaction product is then decomposed with ice and hydrochloric acid, the carbon disulfide is blown off and the residual thionaphthenoyl benzoic acid is purified by re-precipitating it from sodium carbonate solution.

5 parts of the acid thus obtained are poured over in the cold with a quantity of thionyl chloride sufficient to dissolve it, and the mass is then gently heated in order to complete the reaction. The thionyl chloride is then distilled off in a vacuum, the residue is dissolved in carbon disulfied, mixed with 10 parts of aluminium chloride, and the whole is heated on the water-bath for several hours. The reaction mixture is then decomposed by means of ice and hydrochloric acid and the carbon disulfide is blown off. The residual substance is found to be phthaloyl-2.3-thionaphthene which, after re-crystallization, has a correct melting point of 212–214° C. The phthaloyl-2.3-thionaphthene compounds are yellow to brown powders which are insoluble in water, alkalies and acids and yield with alkaline hydrosulfite feebly colored vats dyeing wool yellow to orange tints. These compounds are described but not claimed in my copending application Serial No. 146,574.

In the following claims the terms "phthaloyl-2.3-thionaphthene compound," "thionaphthene compound" and "phthalic anhydride compound" are intended to include the derivatives and substitution products of the said compounds.

I claim:

1. The process of preparing a phthaloyl-2.3-thionaphthene compound which comprises causing a phthalic anhydride compound to act upon a thionaphthene compound in the presence of aluminium chloride, and then further subjecting to a nuclear condensation the thionaphthenoyl benzoic acid compound thus obtained.

2. The process of preparing a phthaloyl-2.3-thionaphthene compound which comprises causing a phthalic anhydride compound to act upon a thionaphthene compound in the presence of aluminium chloride and then further successively treating with thionyl chloride and aluminium chloride the thionaphthenoyl benzoic acid compound thus obtained.

3. The process of preparing phthaloyl-2.3-thionaphthene of the following formula:

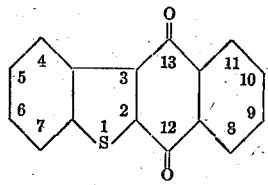

which comprises causing phthalic anhydride to act upon thionaphthene in the presence of aluminium chloride, treating with thionyl chloride the thionaphthenoyl benzoic acid thus obtained and further treating with aluminium chloride in the presence of boiling carbon disulfide the reaction product after its separation from the excess of thionyl chloride.

4. The process which comprises causing phthalic anhydride to act upon thionaphthene in the presence of aluminium chloride.

5. As new products phthaloyl-2.3-thionaphthene compounds of the following general formula:

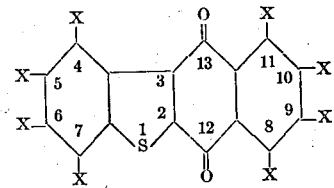

wherein X stands for hydrogen or a substituent.

6. As a new product, phthaloyl-2.3-thionaphthene, corresponding most probably to the formula:

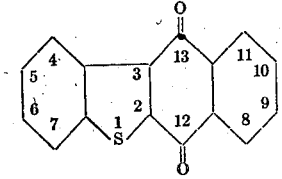

being a yellow powder which is insoluble in water, alkalies and acids and yields with alkaline hydrosulfite a feebly colored vat which dyes wool yellow tints.

In testimony whereof, I affix my signature.

PROFESSOR DR. FRITZ MAYER.